Jan. 26, 1960 P. B. LAVANCHY 2,922,723
PRODUCT AND METHOD OF MANUFACTURE
Filed Jan. 31, 1957
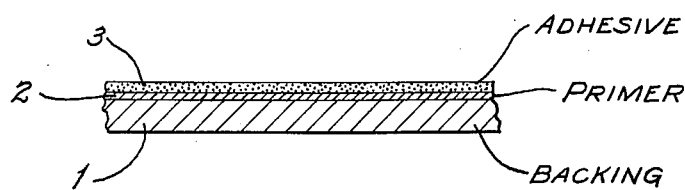
INVENTOR.
PATRICIA BJERREGAARD LAVANCHY
BY 2,922,723
Patented Jan. 26, 1960

2,922,723
PRODUCT AND METHOD OF MANUFACTURE

Patricia Bjerregaard Lavanchy, Drexel Hill, Pa., assignor, by mesne assignments, to Johnson & Johnson, New Brunswick, N.J., a corporation of New Jersey Application January 31, 1957, Serial No. 637,498

15 Claims. (Cl. 117—76)

This invention relates to pressure-sensitive adhesive sheets and tapes. It is concerned particularly with the firm adherence of pressure-sensitive adhesives to their backings, and particularly to hydrophilic backings, preferably of the film type.

Pressure-sensitive adhesive tapes require secure bonds of the tacky pressure-sensitive adhesive to the backings so as to prevent transfer of adhesive when the tacky surface of the tape is pressed into contact with itself, or with a part of the backing, and then pulled apart or if the tape is removed from a surface to which it previously had been adhered. Such bonding is accomplished usually by interposing a primer coat between the pressure-sensitive adhesive layer and the flexible backing. The organic base of the prior art are usually two phase primers consisting, for instance, of a mixture of latex rubber and of hydrophilic material having affinity for the hydrophilic film backing. Such primers fail to firmly bond the adhesive tape when it is subjected to moisture and exhibit particularly poor anchorage in humid climates. Also, many of the heretofore used organic base primers do not possess adequate solvent resistant characteristics to be useful in conjunction with heat curing adhesives for electrical applications. Also, many of the primers of the prior art are water base primers which cause curling and distortion of the flexible backing during processing.

Accordingly, it is an object of this invention to provide new and improved pressure-sensitive adhesive products, particularly sheets and tapes. It is a further object of the invention to provide adhesive sheets having improved anchorage of the adhesive mass on the backings. Still another object is to provide such anchorage permanently and under adverse conditions of high humidity. A particularly important object of the invention is the provision of improved primers for use on normally tacky and pressure-sensitive adhesive products having backings such as cellulosic backings, especially regenerated cellulose and cellulose acetate, or backings of other hydrophilic materials, glue and casein, and particularly having such backings in film form. A further important object of the invention is to provide strong bonding of backing to adhesive in normally tacky and pressure-sensitive adhesive products to prevent transfer of adhesive. A still further object of the invention is to provide a primer which when applied to a backing will not cause a curling or distortion thereof during processing. Still further objects of the invention will be more obvious from the following specification.

In accordance with the invention, a primer is prepared by milling one or more elastomers containing hydrogen until a fluid solution can be obtained by dissolving in a hydrocarbon solvent (e.g. toluene) and adding to a dilute solution of broken down elastomer, an ethylene imino compound of the formula $$M_nR$$

wherein M is the ethylene imino group

$n$ is an integer of at least 2, and R is any organic radical to which the imino groups are attached. In general the elastomer component is in an amount from 99 to 25 parts by weight and the polyimino component 1–75 parts by weight. The preferred limits are 90–50 parts of elastomer component and 10–50 parts of polyimino component.

Although this invention is in no way limited to any theory of action, it is believed that the ethylene imino groups react with both the elastomer component of the primer and with the base film to give unusually good bonding. Among elastomers preferred for the purposes of this invention are the unsaturated elastomers containing active hydrogen groups such as polyisoprene, as exemplified by broken down crude rubber, the copolymers of butadiene and monovinyl monomers such as styrene, in which the diene consists of about 40 percent or more by weight, polychloroprene, and polyvinyl ethers such as polyvinyl isopropyl ether, polyvinyl normal butyl ether, and polyvinyl isobutyl ether. Examples of suitable polyimino compounds suitable for the purpose of this invention are triethylene melamine made by reacting ethylene imine with cyanuric chloride, bis[p(N-ethylene-ureido)phenyl] methane made by reacting ethylene imine with methylene bis(4 phenyl isocyanate) and $\alpha\alpha^1$ bis[N-ethylene imino]p-xylene made by reacting ethylene imine with $\alpha\alpha^1$ dichloro-p-xylene.

The primer of this invention is preferably applied to a hydrophilic base in a very thin coat at a coating weight of from about one-hundredth to about one-quarter of one ounce per square yard, and aged before the adhesive coat is applied. Any suitable hydrocarbon solvent may be used in which the polyimino component is soluble and which function as a solvent or dispersing agent for the elastomeric component. The lower weights of primer are most suitable for films while the upper range specified is used for woven or nonwoven fibrous backings. The time of aging will, of course, vary depending upon the drying temperature. For example, at 120° C. an aging period of about 30 seconds is required while at room temperature an aging period of 24 hours is needed. After the primer is suitably bonded to the base film, a pressure-sensitive adhesive compound may then be applied to the primed sheet at a dry coating weight from about one half to about five ounces per square yard. For best results, the primer and adhesive are both applied from compatible rubber solvents, e.g. heptane. The primer and adhesive are applied from solvent solution by conventional coating equipment such as knife coaters, kiss coaters, etc., etched roll applicators, etc.

As shown in the accompanying drawing the primer is coated on one side of the backing and the adhesive is coated over the primer coat, the primer coat anchoring the adhesive coat to the backing.

The following are examples of organic base primers formed in accordance with this invention. It will be appreciated that these formulations are exemplary and the invention should not be construed as limited to the particular materials and proportions indicated; all proportions recited are in parts by weight.

EXAMPLE I

The primer material is prepared by milling crude rubber until a fluid solution can be prepared in a suitable inert solvent such as toluene, for example, by milling in a tight mill for ten minutes. To a dilute hydrocarbon solution of the broken down elastomer, comprising 0.01 part of triethylene melamine for each 0.99 part of elastomer. The mixture is then thoroughly mixed by use of a suitable solvent.

Examples of additional primer compositions prepared in accordance with the method of Example I are shown below in Table I. The reference ethylene imino compound "#1" refers to triethylene melamine, "#2" refers to bis[p(N-ethylene-ureido)phenyl]methane and "#3" refers to $\alpha\alpha^1$ bis [N-ethylene imino] p xylene. "GRS" refers to a copolymer of butadiene and styrene (50:50) and "PVE" refers to polyvinyl-ether.

Table I

| Example | Polymer | Ethylene Imino Compound | Ratio |
|---|---|---|---|
| II | Crude rubber | #1 | 83:17 |
| III | do | #1 | 80:20 |
| IV | do | #1 | 91:9 |
| V | do | #1 | 50:50 |
| VI | PVE | #1 | 75:25 |
| VII | Crude rubber | #2 | 28:72 |
| VIII | GRS | #1 | 75:25 |
| IX | Crude rubber | #2 | 66:34 |
| X | do | #1 | 95:5 |
| XI | do | #3 | 60:40 |

In forming adhesive tapes in accordance with the present invention, the primer is coated on the backing sheet by any conventional method such as spraying, printing, knife coating, or reverse roll coating. The backing sheet is aged for a period of time in order to allow the primer to become firmly bonded to the backing. As indicated heretofore, a normally tacky and pressure-sensitive adhesive composition is then applied to the primed backing by any conventional coating method, as, for example, those indicated hereinabove suitable for coating the primer.

Although the present invention is primarily concerned with primer compositions to be used on hydrophilic backing elements, such as regenerated cellulose films (cellophane), hydroxy alkyl cellulose ethers, methyl cellulose, and certain hydrophilic types of ethyl cellulose, it should be appreciated that such primers may be used on less hydrophilic films if desired.

The following are examples of normally tacky and pressure-sensitive adhesive tapes formed in accordance with this invention, the backing sheets being primed with primer compositions of the present invention.

EXAMPLE XII

A 1.6 mil cellophane sheet is coated with the primer composition of Example I to a coating weight of about 0.01 of one ounce per square yard and aged for three days at room temperature. A pressure-sensitive adhesive (adhesive A) having the following recipe:

ADHESIVE A

Milled pale crepe rubber _____ 100
Polybetapinene resin _____ 75
Petroleum oil _____ 5
Polymerized trimethyldihydro-quinoline _____ 2 in the form of a solution is applied to the primed sheet from an 18% by weight solution to produce a dry coating weight of approximately 0.8 ounce per square yard.

EXAMPLE XIII

A 1.0 polyethylene terephthalate sheet is coated with the primer composition of Example II to a coating weight of about 0.01 of one ounce per square yard and dried for 6 days at room temperature (20° C.). A pressure-sensitive adhesive B having the following recipe:

ADHESIVE B

Milled smoked sheet rubber _____ 100
Zinc oxide _____ 50
Dehydrogenated rosin _____ 75
Sym. di-beta-napthyl-para-phenylene diamine _____ 2
Lanolin _____ 10 in the form of a solution is applied to the primed sheet from a 35% by weight solution in toluene to produce a dry coating weight of approximately 1.1 ounces per square yard.

EXAMPLE XIV

A 1.6 mil cellophane sheet is coated with the primer composition of Example III to a coating weight of about 0.01 of one ounce per square yard and dried for 3 days at 20° C. A pressure-sensitive adhesive (adhesive C) having the following recipe:

ADHESIVE C

Butadiene-styrene copolymer (butadiene-styrene ratio 70:30, Mooney value 50) _____ 50
Smoked sheet _____ 50
Ester of hydrogenated rosin _____ 50
Polybetapinene resin _____ 16
Polymerized trimethyldihydro-quinoline _____ 2
Petroleum oil _____ 20 in the form of a solution is applied to the primed sheet from a 20% by weight solution in toluene to produce a dry coating weight of approximately 0.8 ounce per square yard.

EXAMPLE XV

A 2.0 mil cellulose acetate sheet is coated with the primer composition of Example IV to a coating weight of about 0.01 of one ounce per square yard and dried for 7 days at 20° C. The pressure-sensitive adhesive A disclosed in above Example XII in the form of a solution is applied to the primed sheet from an 18% by weight solution in heptane to produce a dry coated weight of approximately 0.8 ounce per yard.

EXAMPLE XVI

A 1.6 mil cellophane sheet is coated with the primer composition of Example V to a coating weight of 0.01 of one ounce per square yard and dried for three days at 20° C. The pressure-sensitive adhesive C disclosed in Example XIV in the form of a solution is applied to the primed sheet from a 20% weight solution in toluene to produce a dry coating weight of approximately 0.8 ounce per square yard.

EXAMPLE XVII

A 1.6 mil cellophane sheet is coated with the primer composition of Example VI to a coating weight of about 0.01 of one ounce per square yard and dried for ten minutes at 75–80° C. A pressure-sensitive adhesive (adhesive D) having the following receipe:

ADHESIVE D

Polyvinyl ethyl ether resin (intrinsic viscosity=2.37) __ 100
Hydrogenated rosin _____ 5
Phenylalpha naphthylamine _____ 0.35
Polyethylene glycol 400 (di, tri) ricinoleate _____ 1.5 in the form of a solution is applied to the primed sheet from a 15% by weight solution in toluene to produce a dry coating weight of approximately 0.8 ounce per square yard.

EXAMPLE XVIII

A 2.0 mil cellulose acetate sheet is coated with the primer composition of Example VII to a coating weight of about 0.01 of one ounce per square yard and dried for fifteen minutes at 90–95° C. The pressure-sensitive adhesive A disclosed in Example XII in the form of a solution is applied to the primed sheet from an 18% by weight solution in heptane to produce a dry coated weight of approximately 0.8 ounce per yard.

EXAMPLE XIX

A 1.0 mil polyethylene phthalate sheet is coated with the primer composition of Example VIII to a coating weight of about 0.01 of one ounce per square yard and dried for 10 days at 20° C. The pressure-sensitive adhesive C disclosed in Example XIV in the form of a solution is applied to the primed sheet from a 20% by weight solution in toluene to produce a dry coating weight of approximately 0.8 ounce per square yard.

EXAMPLE XX

A 1.6 mil cellophane sheet is coated with the primer composition of Example IX to a coating weight of 0.01 of one ounce per square yard and dried for 10 minutes at 75–80° C. The pressure-sensitive adhesive B disclosed in Example XIII in the form of a solution is applied to the primed sheet from a 35% by weight solution in toluene to produce a dry coating weight of approximately 1.1 ounces per square yard.

EXAMPLE XXI

A 1.6 mil cellophane sheet is coated with the primer composition of Example X to a coating weight of 0.01 of one ounce per square yard and dried at room temperature for three days. The pressure-sensitive adhesive A disclosed in Example XII in the form of a solution is applied to the primed sheet from an 18% by weight solution in heptane to produce a dry coated weight of 0.8 ounce per square yard.

EXAMPLE XXII

A 1.6 mil cellophane sheet is coated with the primer composition of Example XI to a coating weight of 0.01 of one ounce per square yard and dried at room temperature for three days. The pressure-sensitive adhesive B disclosed in Example XIII in the form of a solution is applied to the primed sheet from a 35% by weight solution in toluene to produce a dry coating weight of approximately 1.1 ounce per square yard.

Anchorage tests were conducted for the primed sheets disclosed in the above Examples XII—XXII. The amount of adhesive coated on the primed sheets was not the amount indicated in Examples XII—XII, but rather 2 ounces of adhesive in each case. A dry anchorage value was determined for each sample and in most cases the wet anchorage was determined, the values obtained being recorded in below Table II. The following methods of testings were used in determining the anchorage values:

While the adhesive is still wet, 80 x 80 cloth is firmly pressed into the adhesive and the laminated structure is then dried. One inch wide strips are cut from the sheet. In testing for wet anchorage, the strips are immersed in water for 1 hour, after which the cloth is separated from the cellophane by the peel-back method of stripping in a tensile machine with a lower jaw speed of 33 inches per minute. In testing for dry anchorage, the strips are not wetted before the cloth is separated from the cellophane. The anchorage value is the average force in ounces per inch width recorded on the tensile machines.

*Table II*

| Example | Dry Anchorage | Wet Anchorage, g. |
|---|---|---|
| XII | 410 g., no primer 230 g | 170 |
| XIII | 1,300 g., no primer 560 g | |
| XIV | 1,100 g | 490 |
| XV | 1,430 g., no primer 500 g | |
| XVI | 680 g | 420 |
| XVII | 750 g | 280 |
| XVIII | 800 g | |
| XIX | 800 g | |
| XX | 900 g | 325 |
| XXI | 800 g | 410 |
| XXII | 600 g | 220 |

From the above data, it is seen that the polyimino containing primers of this invention provide adhesive sheets having improved anchorage of the adhesive to hydrophilic backings. Advantageously, the novel primer compositions improve anchorage under adverse conditions of high moisture. Since these primer compositions are not of the water base type, they may be applied to a backing without causing a curling or distortion thereof during processing.

As shown in the accompanying drawing the novel tapes formed in accordance with this invention comprise a backing 1 having a primer coating 2 for anchoring a coating 3 of a normally tacky and pressure-sensitive adhesive.

The invention in its broader aspects is not limited to the specific steps, processes, compositions, combinations and improvements described, but departures may be made therefrom within the scope of the accompanying claims without departing from the principles of the invention and without sacrificing its chief advantages.

What is claimed is:

1. A normally tacky and pressure-sensitive adhesive tape comprising a hydrophilic backing, a primer coating thereon comprising an elastomer in an amount from 99 to 25 parts by weight selected from the group consisting of polyisoprene, copolymers of butadiene and monovinyl monomers, and polyvinyl ethers and an ethylene imino compound in an amount from 1 to 75 parts by weight of the formula $M_nR$ wherein M is the ethylene imino group

$n$ is an integer of at least 2, and R is any organic radical to which the imino groups are attached, and a second coating on said primer coating of a normally tacky and pressure-sensitive adhesive compatible with said primer coat.

2. A normally tacky and pressure-sensitive adhesive tape in accordance with claim 1 wherein the elastomer is polyisoprene.

3. A normally tacky and pressure-sensitive adhesive tape in accordance with claim 1 wherein the elastomer is butadiene-styrene copolymer.

4. A normally tacky and pressure-sensitive adhesive tape in accordance with claim 1 wherein the elastomer is a polyvinyl ether.

5. An adhesive tape in accordance with claim 1 wherein the ethylene imino compound is selected from the group consisting of triethylene melamine, bis [p (N-ethylene-ureido) phenyl] methane and $\alpha\alpha^1$ bis [N-ethylene imino] p xylene.

6. An adhesive tape in accordance with claim 5 wherein the ethylene imino compound is triethylene melamine.

7. An adhesive tape in accordance with claim 5 wherein the ethylene imino compound is bis [p (N-ethylene-ureido) phenyl] methane.

8. An adhesive tape in accordance with claim 5 wherein the ethylene imino compound is $\alpha\alpha^1$ bis [N-ethylene imino] p xylene.

9. A primer composition for use in anchoring a normally tacky and pressure-sensitive adhesive to a hydrophilic base, said primer composition comprising an elastomer selected from the group consisting of polyisoprene, copolymers of butadiene and monovinyl monomers, and polyvinyl ethers in an amount from 99 to 25 parts by weight and ethylene imino compound selected from the group consisting of triethylene melamine, bis [p (N-ethylene-ureido) phenyl] methane and $\alpha\alpha^1$ bis [N-ethylene imino] p xylene in an amount from 1 to 75 parts by weight.

10. A primer composition in accordance with claim 9 wherein the elastomer is polyisoprene.

11. A primer composition in accordance with claim 9 wherein the elastomer is a butadiene-styrene copolymer.

12. A primer composition in accordance with claim 9 wherein the elastomer is a polyvinyl ether.

13. A primer composition according to claim 9 wherein the ethylene imino compound is triethylene melamine.

14. A primer composition according to claim 9 wherein the ethylene imino compound is bis [p (N-ethyleneureido) phenyl] methane.

15. A primer composition according to claim 9 wherein the ethylene imino compound is $\alpha\alpha^1$ [N-ethylene imino] p xylene.

References Cited in the file of this patent

UNITED STATES PATENTS

| | | |
|---|---|---|
| 2,236,567 | Drew | Apr. 1, 1941 |
| 2,317,965 | Bestian et al. | Apr. 27, 1943 |
| 2,407,566 | Mathes et al. | Sept. 10, 1946 |
| 2,555,745 | Hopkins et al. | June 5, 1951 |
| 2,677,681 | Gill | May 4, 1954 |

UNITED STATES PATENT OFFICE

CERTIFICATE OF CORRECTION

Patent No. 2,922,723                      January 26, 1960

Patricia Bjerregaard Lavanchy

It is hereby certified that error appears in the printed specification of the above numbered patent requiring correction and that the said Letters Patent should read as corrected below.

Column 4, line 56, for "receipe" read -- recipe --; column 5, line 43, for "Examples XII-XII" read -- Examples XII-XXII --; column 8, line 1, for "$\alpha\alpha^1$[N-ethylene" read -- $\alpha\alpha^1$bis[N-ethylene --

Signed and sealed this 26th day of July 1960.

(SEAL)
Attest:

KARL H. AXLINE                      ROBERT C. WATSON
Attesting Officer                 Commissioner of Patents